(12) United States Patent
Ranta

(10) Patent No.: US 6,704,058 B2
(45) Date of Patent: Mar. 9, 2004

(54) SYSTEM AND METHOD OF ADAPTIVE TIMING ESTIMATION FOR HORIZONTAL OVERSCAN DATA

(75) Inventor: Craig S. Ranta, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/476,177

(22) Filed: Dec. 30, 1999

(65) Prior Publication Data

US 2003/0169367 A1 Sep. 11, 2003

(51) Int. Cl.[7] .............................................. H04N 7/084
(52) U.S. Cl. ..................... 348/465; 348/479; 348/473; 348/476; 348/558
(58) Field of Search ................................. 348/465, 473, 348/476, 479, 468, 461, 460, 477, 478, 558

(56) References Cited

U.S. PATENT DOCUMENTS

| | | |
|---|---|---|
| 3,493,674 A | 2/1970 | Houghton |
| 3,743,767 A | 7/1973 | Bitzer et al. |
| 3,891,792 A | 6/1975 | Kimura |
| 3,900,887 A | 8/1975 | Soga et al. |
| 3,993,861 A | 11/1976 | Baer |
| 4,186,413 A | 1/1980 | Mortimer ................... 358/146 |
| 4,207,704 A | 6/1980 | Akiyama |
| 4,368,486 A | 1/1983 | Degoulet et al. ........... 358/146 |
| 4,540,176 A | 9/1985 | Baer .......................... 273/148 |
| 4,599,644 A | 7/1986 | Fischer |
| 4,638,359 A | 1/1987 | Watson ....................... 358/147 |
| 4,660,033 A | 4/1987 | Brandt ........................ 340/825 |
| 4,665,431 A | 5/1987 | Cooper ....................... 358/145 |
| 4,729,563 A | 3/1988 | Yokoi ............................ 273/1 |
| 4,771,344 A | 9/1988 | Fallacaro et al. |
| 4,807,031 A | 2/1989 | Broughton et al. |
| 4,840,602 A | 6/1989 | Rose ........................... 446/175 |
| 4,846,693 A | 7/1989 | Baer |

(List continued on next page.)

FOREIGN PATENT DOCUMENTS

| | | |
|---|---|---|
| EP | 0710022 A2 | 5/1996 |
| WO | WO 91/10490 | 7/1991 |
| WO | WO 92/19073 | 10/1992 |
| WO | WO 93/23955 | 11/1993 |
| WO | WO 94/24820 | 10/1994 |
| WO | WO 00/44460 | 8/2000 |

OTHER PUBLICATIONS

U.S. patent application Ser. No. 09/475,832, Ranta et al.
U.S. patent application Ser. No. 09/476,291, Ranta et al.

*Primary Examiner*—John Miller
*Assistant Examiner*—Jean W. Désir
(74) *Attorney, Agent, or Firm*—Ronald M. Anderson

(57) ABSTRACT

The adaptive timing module is configured for recovering data encoded in a field of a video signal, and further configured for counteracting horizontal phase or picture shift. An adaptive timing processor defines a timing window where the expected prescan portion video signal is expected to be in an encoded video signal. The timing window is divided into sub-portions with a set of sampling points. The adaptive timing processor conducts a sweeping operation over each sub-portion of the prescan portion of the encoded video signal for the presence of a pre-data encoding zone. When a pre-data encoding zone is detected, the adaptive timing processor stores the position of the sub-portion with the pre-data encoding zone, or sets a flag to indicate the presence of a pre-data encoding zone for that particular sub-portion in a particular field. After scanning one or more fields for the presence of a pre-data encoding zone, the adaptive timing processor uses the stored positions of pre-data encoding zones, or uses the flags indicating the pre-data encoding zones to determine a selected sampling point. The adaptive timing processor uses the selected sampling point to lock on to a location for decoding subsequent data in the encoded video signal.

34 Claims, 9 Drawing Sheets

U.S. PATENT DOCUMENTS

| | | | |
|---|---|---|---|
| 4,847,699 A | 7/1989 | Freeman | |
| 4,847,700 A | 7/1989 | Freeman | |
| 4,855,827 A | 8/1989 | Best | 358/143 |
| 4,862,268 A | 8/1989 | Campbell et al. | 358/141 |
| 4,864,607 A | 9/1989 | Mitamura et al. | 379/388 |
| 4,930,019 A | 5/1990 | Chu | 358/335 |
| 4,949,327 A | 8/1990 | Forsse et al. | 369/58 |
| 4,969,041 A | 11/1990 | O'Grady et al. | 358/142 |
| 5,021,878 A | 6/1991 | Lang | |
| 5,108,341 A | 4/1992 | DeSmet | |
| 5,198,893 A | 3/1993 | Lang | 358/93 |
| 5,243,423 A | 9/1993 | DeJean et al. | 358/142 |
| 5,255,097 A | 10/1993 | Spiero et al. | 358/181 |
| 5,270,480 A | 12/1993 | Hikawa | |
| 5,371,545 A * | 12/1994 | Tults | 327/73 |
| 5,398,071 A | 3/1995 | Gove et al. | 348/558 |
| 5,402,419 A | 3/1995 | Osakabe et al. | 370/85.1 |
| 5,450,134 A | 9/1995 | Legate | 348/467 |
| 5,453,794 A * | 9/1995 | Ezaki | 348/461 |
| 5,453,795 A * | 9/1995 | Tults | 348/465 |
| 5,463,423 A * | 10/1995 | Tults | 348/465 |
| 5,483,289 A * | 1/1996 | Urade et al. | 348/465 |
| 5,561,469 A * | 10/1996 | Schultz | 348/465 |
| 5,629,738 A * | 5/1997 | Kim | 348/465 |
| 5,655,945 A | 8/1997 | Jani | |
| 5,703,658 A | 12/1997 | Tsuru et al. | 348/554 |
| 5,752,880 A | 5/1998 | Gabai et al. | 463/1 |
| 5,808,689 A | 9/1998 | Small | 348/476 |
| 5,812,207 A * | 9/1998 | Cahill, III | 348/465 |
| 5,977,951 A | 11/1999 | Danieli et al. | 345/156 |
| 6,005,632 A * | 12/1999 | Cahill, III | 348/465 |
| 6,057,889 A | 5/2000 | Reitmeier et al. | 348/555 |
| 6,072,532 A | 6/2000 | Chieh et al. | 348/478 |
| 6,229,572 B1 | 5/2001 | Ciardullo et al. | 348/473 |
| 6,281,939 B1 * | 8/2001 | Del Castillo et al. | 348/479 |
| 6,377,308 B1 * | 4/2002 | Cahill, III | 348/461 |
| 6,415,439 B1 | 7/2002 | Randell et al. | 725/153 |

* cited by examiner

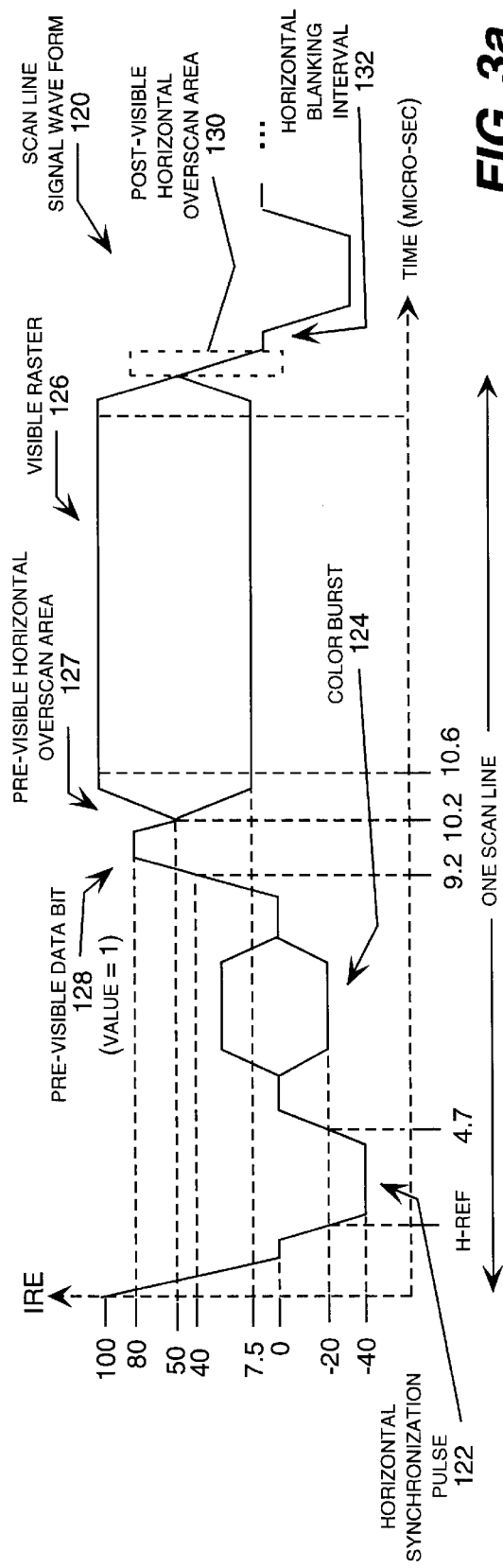
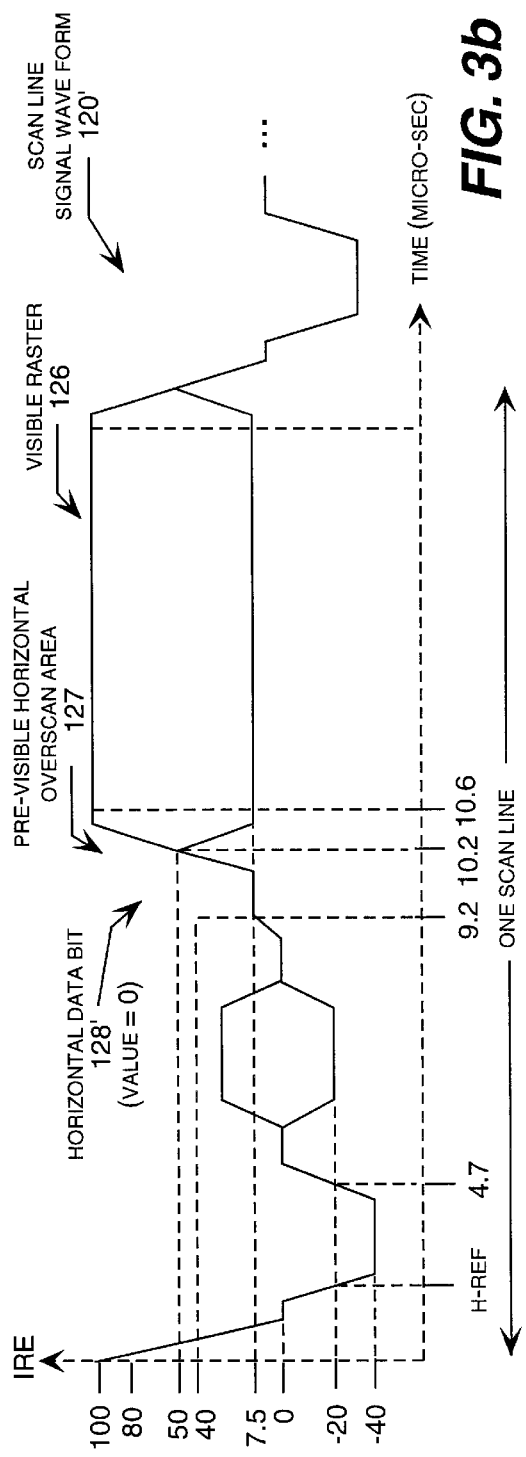
FIG. 3a
FIG. 3b

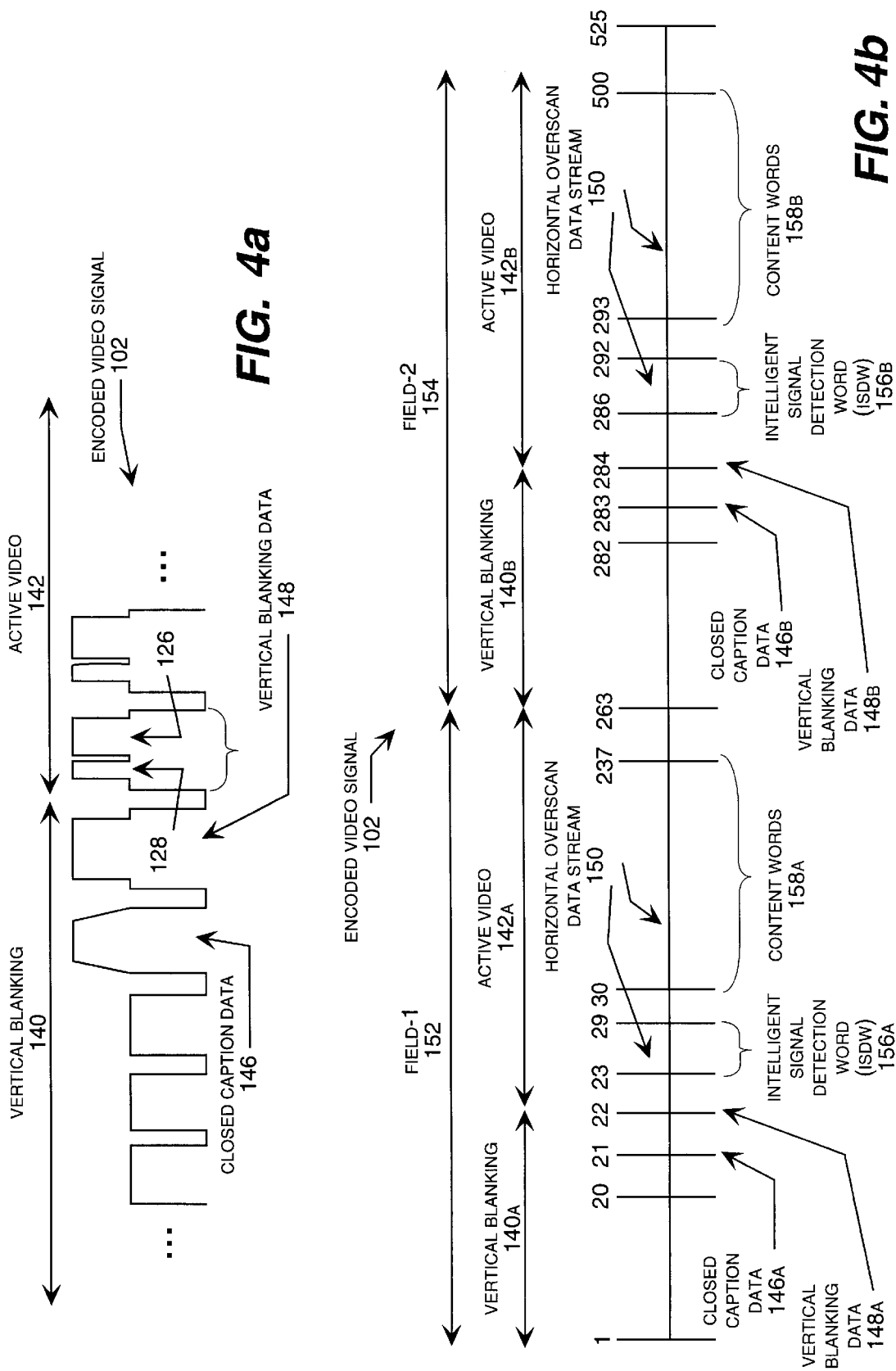

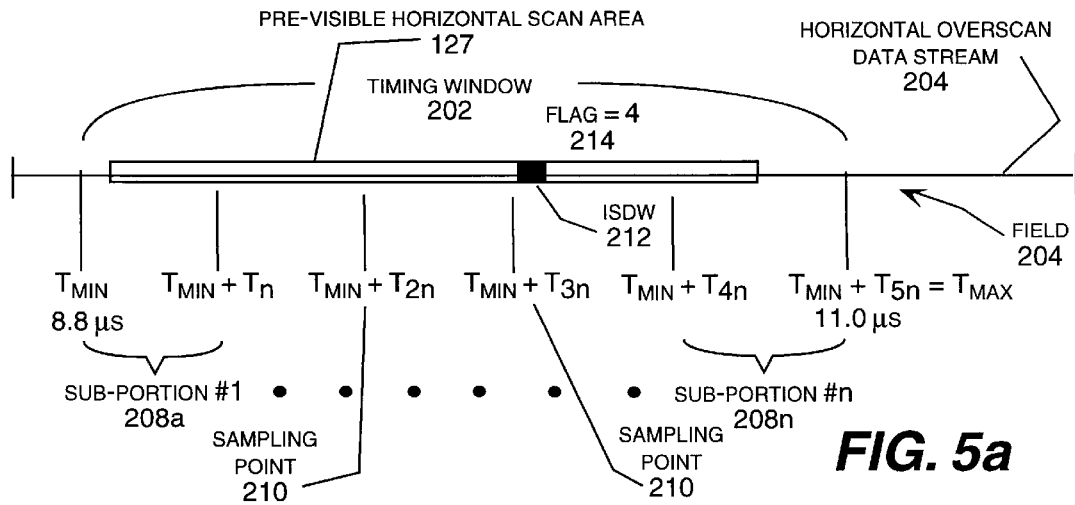
FIG. 5a
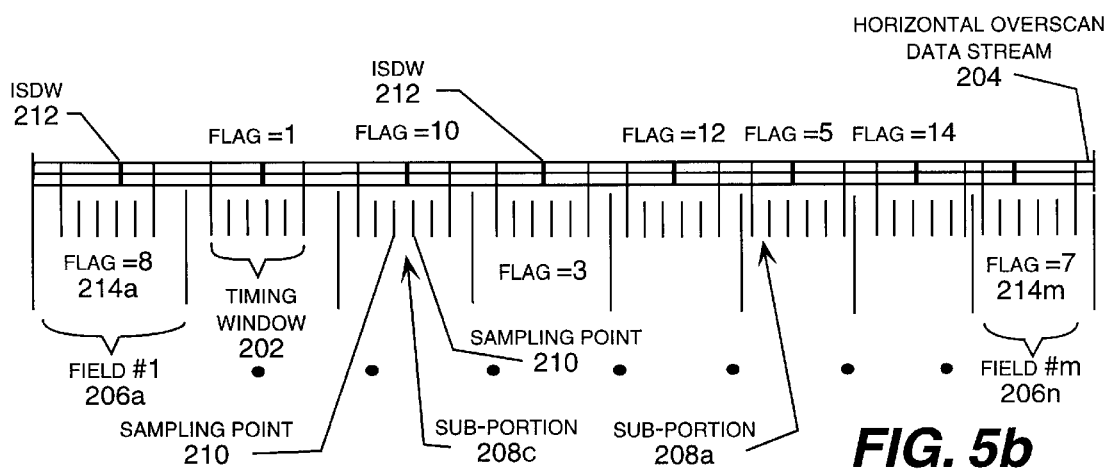
FIG. 5b
| FIELD | EXPECTED ISDW DATA | EXAMPLE DATA @ SAMPLING POINT 1 | EXAMPLE DATA @ SAMPLING POINTS 3,4 | EXAMPLE DATA @ SAMPLING POINT 6 |
|---|---|---|---|---|
| 1 | 8 | 0 | 0 | 7 |
| 2 | 1 | 0 | 0 | 9 |
| 3 | 10 | 16 | 1 | 1 |
| 4 | 3 | 1 | 10 | 5 |
| 5 | 12 | 9 | 3 | 10 |
| 6 | 5 | 0 | 12 | 16 |
| 7 | 14 | 5 | 5 | 16 |
| 8 | 7 | 6 | 14 | 16 |
FIG. 5c
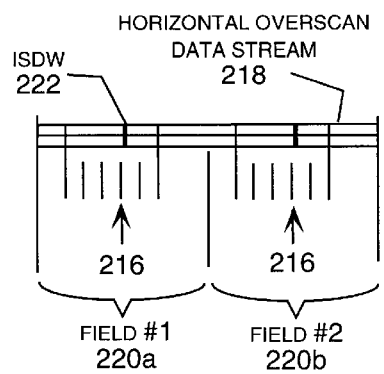
FIG. 5d

SYSTEM AND METHOD OF ADAPTIVE TIMING ESTIMATION FOR HORIZONTAL OVERSCAN DATA

REFERENCE TO RELATED APPLICATIONS

This application incorporates by reference U.S. application Ser. No. 08/885,385 entitled "METHOD AND SYSTEM FOR ENCODING DATA IN THE HORIZONTAL OVERSCAN PORTION OF A VIDEO SIGNAL" filed on Jun. 30, 1997, which is assigned to a common assignee. This application further incorporates by reference U.S. Application entitled "METHOD AND SYSTEM FOR DECODING DATA IN THE HORIZONTAL OVERSCAN PORTION OF A VIDEO SIGNAL" which is assigned to a common assignee and filed concurrently herewith.

TECHNICAL FIELD

This invention relates generally to the field of computer systems and, more particularly to a system and method for detecting digital data encoded in a horizontal overscan portion of a video signal.

BACKGROUND OF THE INVENTION

Ancillary digital data has been transmitted on analog television signals via various methods for several years. This digital data is used today for the purposes of closed-caption displays, interactive television, and commercial distribution of real time data such as stock quotes and weather reports. Various schemes are used to encode digital data onto the signal, each which has advantages and disadvantages. Horizontal overscan data insertion, invented by Microsoft, is a new method of broadcasting ancillary digital data onto NTSC and PAL television signals and has many desirable characteristics which make it superior to other methods such as VBI (vertical blanking insertion) and field luminance modulation (ref. U.S. Pat. No. 4,807,031).

Interactive toys, games, and learning products for the home are particularly useful applications of data broadcast technology. The data broadcast receiver can be coupled to a wireless data transmitter which removes the need for a cable between the interactive device and the ancillary data receiver. This allows a wider variety of devices and in particular allows television interactive educational toys for children to be developed without the hazards of becoming entangled in a cord to the ancillary data receiver.

In order to effectively broadcast the control data in connection with a video signal, several often competing objectives should be attained. First, as noted above, the control data should be temporarily synchronized with the video signal so that the actions of the controlled devices operate in synchronism with the programming information displayed on the television or monitor. Second, the control data should be easily concatenated with a standard video signal for transmission in a variety of broadcast media using standard equipment. Third, the control data should not interfere with the video signal or visibly disrupt the display of the video signal. Fourth, sufficient bandwidth should be provided in the upstream communication link (e.g., a broadcast-level communication link) to fully satisfy the bandwidth requirements of the downstream communication link (e.g., local wireless communication link). In addition, it would be advantageous for additional bandwidth to be available in the upstream communication link for transmitting additional information for other data sinks to provide advertising, subscription, or emergency warning services, such as e-mail, foreign language subtitling, telephone pages, weather warnings, configuration data for a set-top box, and so forth. It would also be advantageous for the bandwidth of the upstream communication link to be adjustable to meet the cost and performance needs of a wide variety of consumers.

As with the downstream wireless communication link, the protocol for the upstream communication link should be addressable so that several wireless controlled devices, as well as other data sinks, may be controlled simultaneously. The protocol should also be error tolerant and accommodate forward compatibility for future wireless controlled devices and other services that may be provided through the broadcast media. All of these attributes should be implemented at a cost that is feasible to deploy in connection with a system that is primarily intended to be a children's entertainment product.

Conventional horizontal overscan data receivers are presently used in consumer products and toys to receive signals from the controllers. Controllers send signals such as video signals to these receivers so that consumer products and toys can be interactive with consumers. To provide a synchronized video signal, horizontal overscan receivers rely on the presence of a horizontal synchronization pulse in the horizontal previsible overscan region of the video signal. A video data pulse containing encoded horizontal overscan data appears in a fixed time window or horizontal overscan window following the horizontal synchronization pulse. The horizontal overscan receiver expects to see this data in a predetermined time window on a predetermined number of lines of the video image field. Because the expected time window for occurrence of the data pulse is fixed and predetermined, shifting of the data pulse earlier or later than the expected position can cause data errors in existing systems.

Conventional horizontal overscan data receivers are therefore sensitive to a phenomenon known as horizontal picture shift, or horizontal phase shift. Horizontal picture shift occurs when the active video data shifts from its expected horizontal data position. If the active video data shifts to the left or right by more than approximately 400 ns, then active video data is found in the fixed time window or horizontal overscan window where the receiver expects to find horizontal overscan data. Such a shift in the active video signal corrupts the video data, thus affecting the quality and content of the received data signal.

A variety of different hardware and processing equipment can be introduced into the video stream as it travels from the originating source, through satellite systems, and to the consumer via cable. Each type or brand of video processing equipment introduces a different amount of distortion into the fixed time window or horizontal overscan window. This distortion varies the amount of horizontal picture shift experienced by the horizontal overscan data receiver. For example, two different amplifiers connected to the same cable broadcast system will introduce different amounts of distortion into the video signal. Thus, each amplifier will create a varying amount of horizontal picture shift upon the video signal.

Conventional methods for recovering horizontal overscan data encoded in a video signal use a fixed timing window in the area where horizontal overscan data is expected to reside. Typically, a data pulse is expected between 9.2 and 10.6 microseconds after the horizontal reference synchronization point (HREF). If horizontal phase shift causes active video to shift left of the expected data range, then video beginning at 10.2 microseconds (the beginning of the viewable picture area) will shift into the data window and cause decoding errors. Alternatively, if the horizontal phase shift causes video to shift right, then horizontal overscan data will shift out of the expected data window and cause decoding errors. Using conventional methods for recovering horizontal overscan data requires television broadcasters to maintain timing parameters to within +/−100 nanoseconds of the original timing for proper decoding of the horizontal overscan data by a consumer decoder.

Furthermore, devices employed to maintain this timing accuracy are expensive and degrade the video signal slightly. Many broadcasters do not want to invest in expensive pieces of equipment to correct horizontal phase shift.

Thus, there is a need in the art for a system and method that improves the method for data recovery from a video signal encoded with horizontal overscan data.

There is a further need in the art for a system and method that counteracts horizontal picture shift and permits the recovery of horizontal overscan data from an encoded video signal.

Furthermore, there is a need in the art for a system and method that corrects horizontal phase shift and is relatively inexpensive and non-complex.

SUMMARY OF THE INVENTION

The present invention meets the needs described above in a system and method for data recovery from a video signal encoded with horizontal overscan data. Furthermore, the present invention provides a system and method for counteracting horizontal picture or phase shift in a video signal. The present invention also provides a system and method that corrects for the presence of horizontal phase shift and is relatively inexpensive and non-complex.

Generally described, the invention is an adaptive timing module with an adaptive timing processor. The adaptive timing module is configured for extracting and decoding digital data encoded in a horizontal overscan portion of a video signal. The adaptive timing module conducts a sweeping operation through a timing search range within a plurality of scan lines over multiple fields of the video signal to detect a horizontal position within the scan lines associated with the digital data. Based on the sweeping operation, the adaptive timing module determines a desired horizontal detection position within the scan lines. The adaptive timing module then detects digital data encoded at the desired horizontal detection position of subsequent fields of the video signal.

More particularly described, the adaptive timing module conducts a sweeping operation through a timing search range within a plurality of scan lines over multiple fields of the video signal by dividing the timing search range into a plurality of equal sub-portions. Each sub-portion of the timing search range is scanned for the presence of a special data sequence within the scan lines associated with the digital data. The adaptive timing module stores the data detected within each sub-portion, and determines a center point or average of the positions of the sub-portions where a valid sequence is detected. The module then determines a desired horizontal detection position within the scan lines by locking onto the center point or average of the sub-portions where a valid sequence is detected.

In another aspect of the invention, the adaptive timing module conducts a sweeping operation through a timing search range between 8.8 and 11.0 microseconds from a horizontal synchronization pulse or a timing signal that indicates the beginning of a scan line. The horizontal position can include a specific data sequence, such as an intelligent signal detect word. (ISDW), that indicates the beginning of a field of digital data. The adaptive timing module then determines a desired horizontal detection position within the scan lines by comparing the observed data sequence to a stored data sequence, such as a stored intelligent signal detect word (ISDW).

In yet another aspect of the invention, the adaptive timing module repeatedly detects digital data encoded at the desired horizontal detection position of subsequent fields of the video signal until a reset condition is enabled. A reset condition includes the elapse of a predetermined length of time, or manually triggering a reset button.

The invention may also be embodied in a display device for recovering data from a video signal divided into frames, wherein each frame comprises a plurality of horizontal scan lines consecutively illuminated on the display device, wherein each scan line comprises a prescan portion comprising a pre-data encoding zone, and wherein the display device scans the prescan portion for the presence of encoded data in the pre-data encoding zone over a plurality of subsequent frames. The display device determines a set of sampling positions within a prescan portion, and sweeps over the set of sampling positions for the presence of encoded data. The display device detects encoded data within the prescan portion.

In another aspect of the display device, the display device determines a center point or average location of the sampling positions. The display device locks onto the center point of the sampling positions, and uses the center point or average location of the sampling positions for recovering subsequent data from the video signal.

That the invention improves over the drawbacks of the prior art and accomplishes the advantages described above will become apparent from the following detailed description of the exemplary embodiments and the appended drawings and claims.

BRIEF DESCRIPTION OF THE DRAWINGS

FIG. 3a is a waveform diagram illustrating a data bit value "one" encoded in the horizontal overscan portion of a scan line of an encoded video signal.

FIG. 3b is a waveform diagram illustrating a data bit value "zero" encoded in the horizontal overscan portion of a scan line of an encoded video signal.

FIG. 4a is a diagram illustrating the location of data bits in a portion of a frame of an encoded video signal.

FIG. 4b is a diagram illustrating the location of data bits in two interlaced fields of a frame of an encoded video signal.

FIG. 5a is a diagram illustrating a timing window divided into equally sized sub-portions.

FIG. 5b is a diagram illustrating a set of fields divided into equally sized sub-portions.

FIG. 5c is a diagram illustrating a flag table for determining a selected sampling point within a set of scanned fields.

FIG. 5d is a diagram illustrating a subsequent video signal having a selected sampling point for the adaptive timing processor to lock onto.

DETAILED DESCRIPTION OF DISCLOSED EMBODIMENTS

The invention may be implemented as an adaptive timing software module that counteracts horizontal picture shift and permits the recovery of horizontal overscan data from an encoded television signal. As an object-oriented program, the adaptive timing module exposes a standard interface that client programs may access to communicate with the adaptive timing module. The object-oriented architecture permits a number of different client programs, such as application programs, and the like, to use the adaptive timing module. For example, the adaptive timing module can be used with an "actimates" application program. Furthermore, hardware devices such as a display device or a data decoder may communicate with the adaptive timing module through the standard interface.

The interface exposed by the adaptive timing module allows the module to receive encoded data from an audio/video signal source. The adaptive timing module receives encoded data from the audio/video signal source, and recovers data encoded within the audio/video signal.

Although the specification describes an exemplary simplex environment for an embodiment of the adaptive timing module, the adaptive timing module can also be used in either a simplex or duplex environment, including a "REAL-MATION" system as described in U.S. application Ser. No. 08/885,385 entitled "Method and System for Encoding Data in the Horizontal Overscan Portion of a Video Signal" filed on Jun. 30, 1997, which is assigned to a common assignee and incorporated herein by reference.

Figure 1:
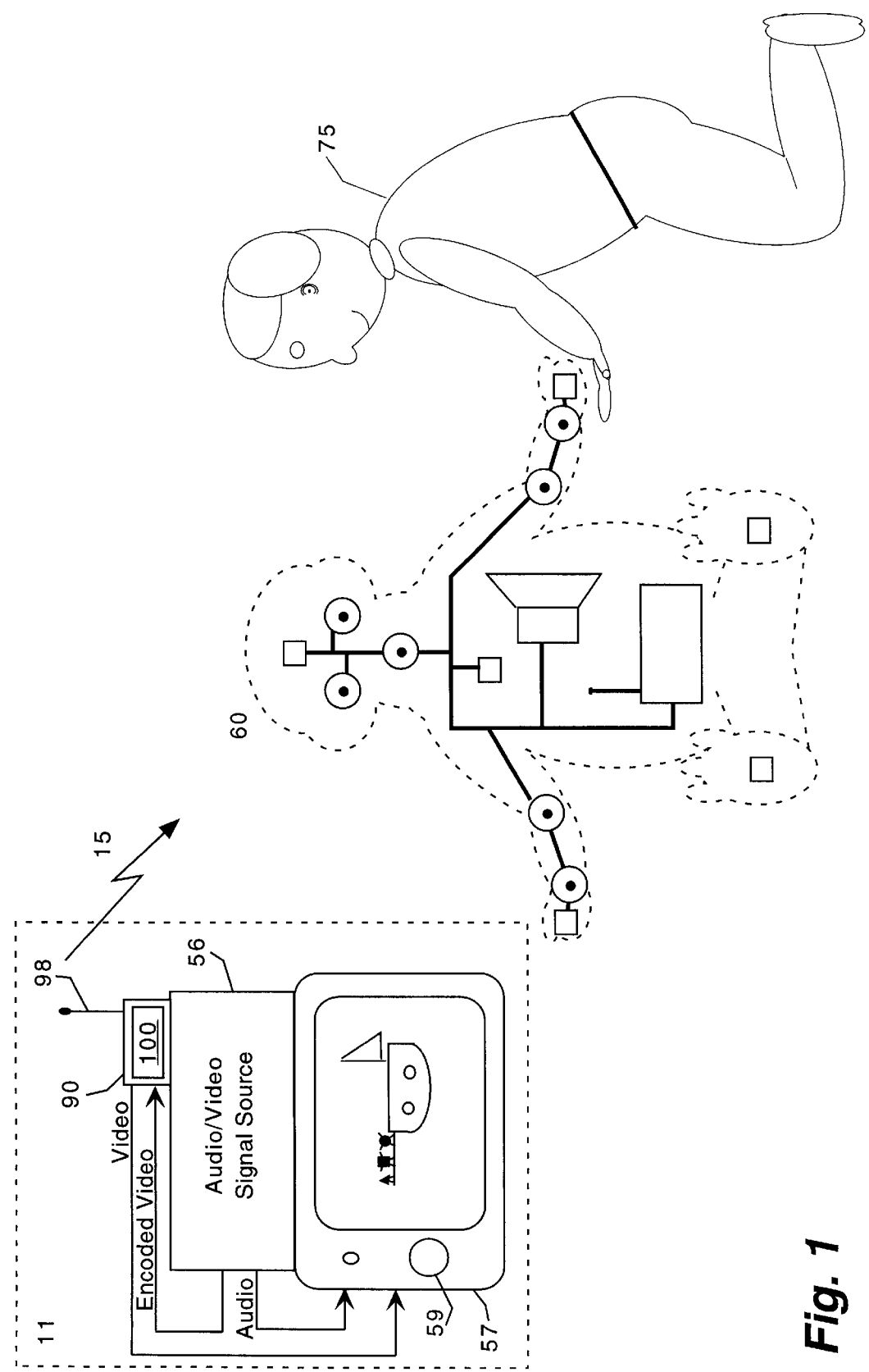
FIG. 1 is block diagram of a duplex wireless control environment including a controller and a controlled device.

FIG. 1 illustrates an exemplary simplex environment for embodiments of the present invention. This simplex environment may be operated as a learning and entertainment system for a child. The simplex environment includes a controller 11 that controls a controlled device 60. The controller 11 includes an audio/video signal source 56, a wireless modulator 90, an antenna 98, and a display device 57 including a speaker 59. The controller 11 transmits control data to the controlled device 60 via an antenna 98 and a RF communication channel 15. To accomplish this task, the wireless modulator 90 interfaces with the audio/video signal source 56 and the display device 57 through a standard video interface. Over this standard video interface, the wireless modulator 90 receives a video signal encoded with control data (encoded video) from the audio/video signal source 56. The wireless modulator 90 extracts the control data from the encoded video signal, and then transfers the control data to a controlled device 60 through the RF communication channel 15.

In addition, the wireless modulator 90 passes the video signal to the display device 57. The audio/video signal source 56 also interfaces with the speaker 59 in the display device 57. Over this interface, the audio/video signal source 56 provides audio for an audio/video presentation. Thus, a child 75 can observe the audio/video presentation on the display device 57 and the speaker 59 while the wireless modulator 90 transmits control data to one or more controlled device 60. The reception of the control data causes the controlled device 60 to move and talk as though it is a character in the audio/video presentation.

An adaptive timing module 100 is deployed with the controller 11 as part of the wireless modulator 90. The adaptive timing module 100 permits the controller 11 to improve the recovery of control data from the encoded video signal and to counteract horizontal phase shift by scanning the video signal for a selected sampling point. Using the selected sampling point, the controller 11 extracts the control data from the encoded video signal and generates the RF-modulated control signals for transmission to the controlled device 60.

There is no need to modify the encoded video signal before passing it to the display device 57. Typically, the controller 11 receives the encoded video signal, which is a standard video signal that has been modified to include digital information in the horizontal overscan intervals of the scan lines, which are invisible to the display device 57. Thus, the display device 57 can receive and display the encoded video signal without modification.

Typically, conventional methods and techniques are used to combine control data with the video signal by encoding the control data onto the video signal (i.e., generating an encoded video data stream). One such encoding technique includes modulating the luminance of the horizontal overscan area of the video signal on a line-by-line basis. For example, the overscan area of each scan line may be modulated to represent a single control data bit. Furthermore, the field boundaries of the video signal provide a framing structure for the control data, in which each frame contains a fixed number of data words.

Figure 2:
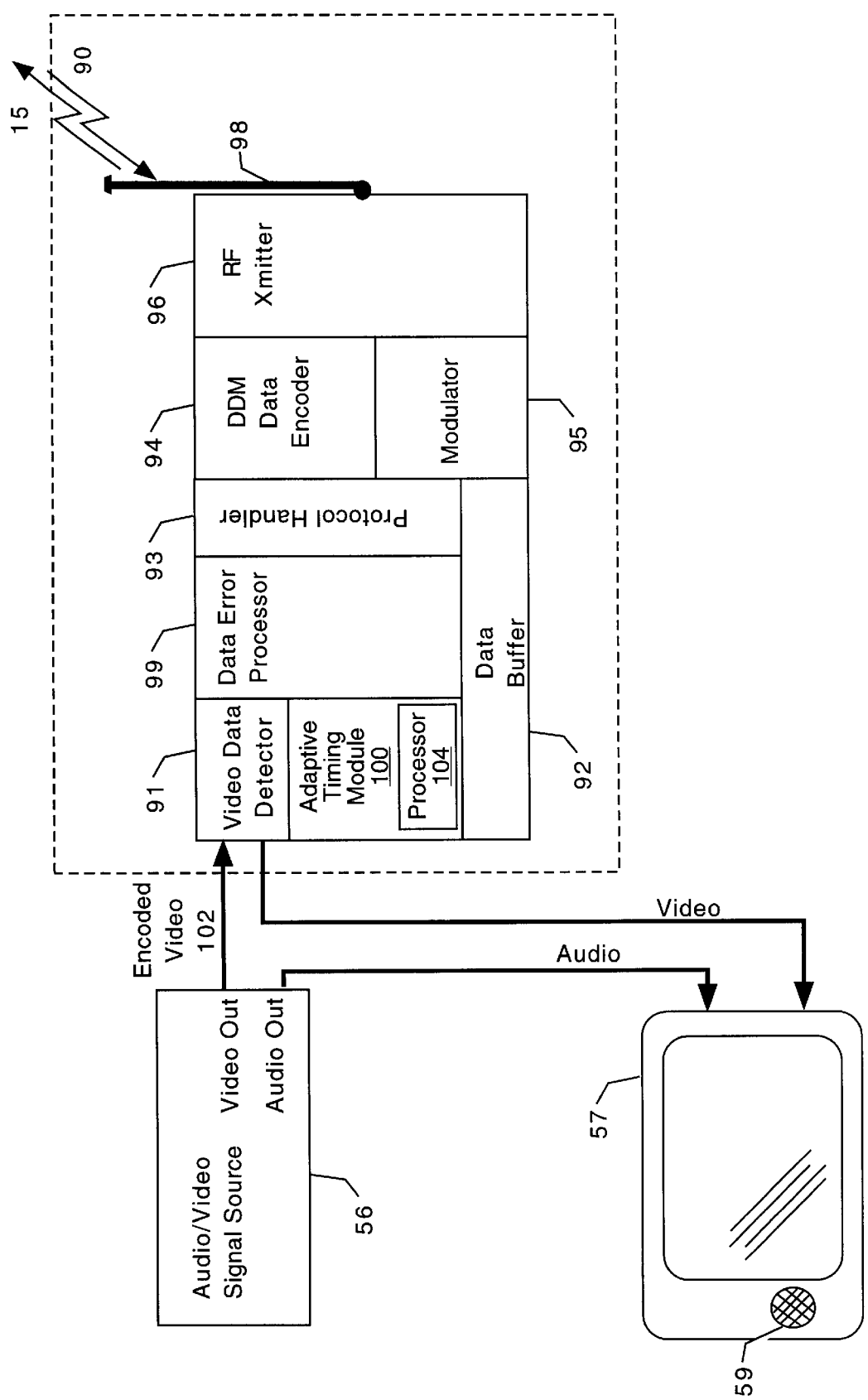
FIG. 2 is a functional block diagram that illustrates the components of a system incorporating an adaptive timing module for recovering data from a television signal encoded with horizontal overscan data in accordance with the present invention.

FIG. 2 is a block diagram illustrating the various components that define the wireless modulator 90. Each of the components of the wireless modulator 90 may be implemented in hardware, software, or a combination of hardware and software. The adaptive timing module 100 is associated with the video data detector 91 of the wireless modulator 90. The video data detector 91 receives an encoded video signal 102 originating from an audio/video signal source 56, and utilizes the adaptive timing module 100 to recover control data from the encoded video signal and to counteract horizontal phase shift. The adaptive timing module 100 determines a selected sampling point in the encoded video signal 102. The adaptive timing module 100 extracts the control data from the encoded video signal 100, provides the control data to the data error processor 99, and simultaneously provides the encoded video signal 100 to the display device 57.

The data error processor 99 analyzes the control data to detect and attempt to correct any errors that may exist in the control data. After correcting any errors in the control data, the protocol handler 93 receives the recovered and verified control data and assembles message packets for transmission to one or more controlled devices, represented by the controlled device 60. Upon assembling a message packet, the protocol handler 93 provides the message packet to a data encoder 94. The data encoder 94 encodes the data and provides the encoded data to the RF transmitter 96. The RF transmitter 96 receives the encoded data and modulates a predefined RF carrier (i.e., a predefined RF channel approved for use in connection with the wireless communication system) with the encoded data. The RF transmitter then transmits the modulated carrier through the antenna 98. During processing of the control data, the various components of the computer system 20 or the wireless modulator 90 may temporarily store the control data in a data buffer, such as the representative data buffer 92.

The display device 57 receives the video signal from the video data detector 91 or data decoder or another source along with an audio signal from the audio/video signal source 56. The display device 57 and the speaker 59 then display the audio/visual presentation defined by the video signal, typically including a series of scenes depicted on the display device 57 and the speaker 59, in a conventional manner.

As noted previously, the audio/video presentation on the display device 57 and the control data that is transmitted from antenna 98 are synchronized so that the controlled device 60 behaves as a character in the scene depicted on the display device 57. The processes of detecting the control data, correcting any errors, encoding the control data, and then modulating a carrier may introduce a slight delay. Nevertheless, embedding the control data within the video data in the encoded video signal effectively synchronizes the operation of the controlled device with the scene depicted on the display device 57. In other words, the video signal received by the display device 57 and the control data transmitted from antenna 98 are synchronized because they are obtained from the same area of the original encoded video signal, in which context sensitive control data is embedded within a video signal. Thus, the encoded video signal may be separated in real-time into control data and related video data so that the controlled devices move and/or talk in a manner that relates to the audio/video presentation.

The audio/video signal source 56 may be any of a variety of conventional video sources, such as a video camera, a broadcast or cable television signal, a video tape player, the Internet transmitting a video signal, a computer generating a video signal, and so forth. The video signal may be any type of video signal that includes a plurality of frames that each include a plurality of scan lines. For example, the video signal may be a standard 525-line, two-field interlaced NTSC television signal that includes 30 frames per second, each frame including two fields of 262.5 interlaced lines, as is well known to those skilled in the art A video data encoder 94 merges encoded data with the lines of the video signal to create an encoded video signal 102, as described in detail with respect to FIGS. 3*a–b* and 4*a–b*. A protocol is defined for the encoded data that is addressable, forwardly compatible, error tolerant, and feasible to deploy in connection with a system that is primarily intended to be a children's entertainment product. This protocol is described in detail with respect to U.S. application Ser. No. 08/795,710 entitled "PROTOCOL FOR A WIRELESS CONTROL SYSTEM" filed on Feb. 4, 1997, which is assigned to a common assignee and incorporated herein by reference.

The video data encoder 94 transmits the encoded video signal 102 to a video data detector 91 or adaptive timing module 100, which may be a remote device that receives the encoded video signal 102 by way of a broadcast-level transmission. Alternatively, a video data detector 91 or adaptive timing module 100 may be a local device, for example in an intercom application. The encoded data does not interfere with the transmission of the underlying video signal. Thus, the encoded video signal 102 may be transmitted using any type of video transmission media, such as a broadcast-level cable television signal, a video tape player, the Internet transmitting a video signal, a computer generating a video signal, and so forth. In addition, because the encoded data is located in the pre-visible or post-visible portions of the video signal, the encoded data does not visibly interfere with the operation of typical televisions or monitors. Therefore, the encoded video signal 102 may be passed directly from the video data detector 91 or adaptive timing module 100 to the display device 57, which displays the underlying video signal undisturbed by the encoded data.

Utilizing the adaptive timing module 100, the video data detector 91 detects the presence of the encoded data in the encoded video signal 102 by detecting the presence of an intelligent signal detection word (ISDW), as described with reference to FIGS. 3*a–b* and 4*a–b*. Preferably, a single ISDW is transmitted in the same location of each field of the encoded video signal 102, such as lines 23–29 in field-1 and 286–292 in field-2, of a standard interlaced 525-line NTSC television signal. A consecutive series of the ISDWs defines a dynamic validation sequence in which each ISDW varies in at least two bits from the immediately preceding signal detection word. For example, the dynamic validation sequence may be the binary representation of 8, 1, 10, 3, 12, 5, 14, 7.

The adaptive timing module 100 corrects horizontal overscan or phase'shift errors in the encoded video signal 102. The adaptive timing module 102 includes an adaptive timing processor 104 to execute a routine to determine a set of sampling positions and sub-portions within a prescan portion of the encoded video signal 102. The adaptive timing processor 104 sweeps over the set of sampling positions and sub-portions for the presence of encoded data. When the adaptive timing processor 104 detects encoded data such as an ISDW within the prescan portion, the adaptive timing processor 104 uses the sub-portions containing encoded data to determine a selected sampling point such as a center point or average location of the sub-portions containing encoded data. The adaptive timing processor 104 locks onto the selected sampling point and uses the selected sampling point for recovering subsequent data from the encoded video signal 102.

The adaptive timing processor 104 reads the data, if any, in the specified lines, corrects the data for correctable errors that may have occurred in the ISDW bits, and detects the presence of the ISDW. In each frame, the ISDW is typically followed by a number of content words. If adaptive timing processor 104 detects the presence of the ISDW in the encoded video signal 104, adaptive timing processor 104 extracts the content words from the encoded video signal and assembles the content words into a serial data communication signal 106. The adaptive timing processor 104 then transmits a serial data communication signal to a data error processor 99.

The data error processor 99 strips out the error correction bits, corrects any correctable errors in the content bits, and assembles the corrected content words into a 9-bit error corrected data stream. This 9-bit error corrected data stream is transmitted to a protocol handler 93, which includes a number of data handlers that detect and route device-specific control data to their associated data sinks. The addressing protocol for the content data is described with reference to U.S. application Ser. No. 08/795,710 entitled "PROTOCOL FOR A WIRELESS CONTROL SYSTEM" filed on Feb. 4, 1997, which is assigned to a common assignee and incorporated herein by reference.

Although the various components and modules have been described separately, one skilled in the art should recognize that the components and modules could be combined in various ways and that new program components and modules could be created to accomplish similar results.

FIGS. 3a and 3b show the location of the encoded data in the context of a single scan line 120, 120' of an encoded video signal 102. FIG. 3a is a waveform diagram illustrating a data bit value "one" 128 encoded in the horizontal overscan portion of a scan line 120 of the encoded video signal 102. The scan line represents one line of one frame displayed on the display device 57. The vertical axis represents the magnitude of the signal waveform 120 in units of IRE and the horizontal axis represents time in microseconds, as is familiar to those skilled in the art. Although FIGS. 3a–b are not drawn precisely to scale, important reference points are marked in the units of their corresponding axis. The waveform 120 for the scan line begins with a horizontal synchronization pulse 122 down to −40 IRE, which is a timing signal that indicates the beginning of the scan line (i.e., time=0) when the leading edge of the pulse passes through −20 IRE to establish the horizontal reference point "H-REF." The horizontal synchronization pulse 122 is followed by a sinusoidal color burst 124 (the approximate envelope is shown), which is used as a calibration signal for the display device 57. The color burst 124 is followed by a waveform representing the visible raster 126 (the approximate envelope is shown), which creates and typically overlaps slightly the visible image on the display device 57.

The waveform 120 includes a pre-visible horizontal overscan area 127 or prescan portion of the horizontal overscan data stream, approximately from 9.2 microseconds to 10.2 microseconds after H-REF, that occurs after the color burst 124 and before the visible raster 126. A video data encoder 94 locates a pre-visible (i.e., before the visible raster 126) data bit "one" 128 by driving the waveform 120 to a predetermined high value, such as 80 IRE, in the interval from 9.2 microseconds to 10.2 microseconds after H-REF. Because the pulse denoting the data bit "one" 128 occurs after the calibration interval of the color burst 124 and before the visible raster 126, it does not interfere with the operation of the display device 57 or appear on the image displayed.

FIG. 3b is a waveform diagram illustrating a data bit value "zero" 128' encoded in the horizontal overscan portion of a scan line of the encoded video signal 104. The video data encoder 94 locates the pre-visible data bit "zero" 128' by driving the waveform 120 to a predetermined low value, such as 7.5 IRE, in the interval from 9.2 microseconds to 10.2 microseconds after H-REF.

As noted above, each 16-bit content word includes nine data bits, and each frame includes 13 content words. Thus, encoding one bit per scan line produces a bandwidth for the data encoded in a typical 59.94 Hertz NTSC video signal of 7,013 Baud. This bandwidth is sufficient to provide a data sink with sufficient data to control several wireless controlled devices 60 in the manner described above. See also, the related patent application, U.S. application Ser. No. 08/795,710 entitled "PROTOCOL FOR A WIRELESS CONTROL SYSTEM" filed on Feb. 4, 1997, which is assigned to a common assignee and incorporated herein by reference.

The 7,013 Baud one-bit-per-scan-line bandwidth of the encoded data is also sufficient to control several other data sinks to provide additional services, such as advertising, subscription, and emergency warning information for transmission to the display device 57 and other data sinks. For example, these services might include e-mail, foreign language subtitling, intercom capability, telephone pages, weather warnings, configuration data for a set-top box, and so forth. At present, the 7,013 Baud one-bit-per-scan-line bandwidth is preferred because it provides sufficient bandwidth for the "REALMATION" system and minimizes the cost of the system components, in particular the video data encoder 94 and the video data detector 91. The bandwidth may be increased, however, by locating a second pulse in the post-visual horizontal overscan area 130, which occurs after the visible raster 126 and before the horizontal blanking interval 132 (during which the electron gun in the CRT of the display device 57 sweeps back from the end of the just completed scan line to the beginning of the next scan line).

And the bandwidth may be further increased by enabling each pulse 128, 130 to represent more that just two (1,0) states. For example, for 3 states (c.f., the 1.0, 1.5, 2.0 DDM pulse widths), an analog of the "REALMATION" DDM protocol could be used. For 4 states, the pulse could represent 2 bits (e.g., 100–80 IRE=1,1; 70–50 IRE=1,0; 40–20 IRE=0,0; 10 to −40 IRE=0,1). For 8 states, the pulse could represent 3 bits; for 16 states, the pulse could represent 4 bits, and so forth. For example, if data pulses are used in both the pre-visual horizontal overscan area 127 and the post-visual horizontal overscan area 130, each data pulse having 16 states, each scan line would be able to transmit eight bits. This would increase the bandwidth from 7,013 Baud to 56,104 Baud, which might be worth the increased cost for the video data encoder 94 and the video data detector 91 for future applications.

FIGS. 4a and 4b show the location of encoded data in the context of a standard NTSC video frame. FIG. 4a is a diagram illustrating the location of data bits in a portion of a standard 525-line two-field interlaced NTSC video signal. Each frame of the video data includes a vertical blanking interval 140 (during which the electron gun in the CRT of the display device 57 sweeps back and up from the end of the just completed frame to the beginning of the next frame) followed by an active video interval 142, which includes a number of left-to-right scan lines that sequentially paint the display device 57 from the top to the bottom of the screen. At the end of the vertical blanking interval 140, the last two pulses are typically reserved for closed caption data 146 and vertical blanking data 148, which may be already dedicated to other purposes. In addition, the bottom of each field is typically corrupted by head switching noise present in the output of helical-scan video tape players of consumer formats such as VHS and 8 mm. Therefore, the horizontal overscan portion of individual scan lines provides the preferred location for encoded data bits 128, 128' of the encoded video signal 102.

FIG. 4b is a diagram illustrating the location of data bits in the two interlaced fields of the standard NTSC video frame. That is, FIG. 4b shows the location of the encoded data in the context of a complete NTSC 525-line two-field interlaced video frame. The frame of video data includes lines 1–262 in field-1 152 interlaced with lines 263–525 in field-2 154. Field-1 152 includes a vertical blanking interval 140a and in active video interval 142a. The vertical blanking interval 140a includes lines 1–22 and concludes with line 21, which may include closed caption data 146a, and line 22, which may include vertical blanking data 148a. An ISDW 156a in encoded in lines 23–29 and content data 158a is encoded in lines 30–237. Field-2 154 includes a vertical blanking interval 140b and a active video interval 142b. The vertical blanking interval 140b includes lines 263–284 and concludes with line 283, which may include closed caption data 146*b*, and line 284, which may include vertical blanking data 148*b*. An ISDW 156*b* is encoded in lines 286–292 and content data 158*b* is encoded in lines 293–500.

Each ISDW preferably includes a plurality of data bits and a plurality of error correction bits defining a correction sequence that allows a single-bit error in the data bits to be detected and corrected. For example, the ISDW may include a seven-bit Hamming code (i.e., four data bits and three error correction bits) in the format shown below in Table 1.

TABLE 1

| Video Line Number | | | |
|---|---|---|---|
| Field 1 | Field 2 | Symbol | Description |
| 23 | 286 | Q0 | Sequence Word Bit 0 |
| 24 | 287 | Q1 | Sequence Word Bit 1 |
| 25 | 288 | Q2 | Sequence Word Bit 2 |
| 26 | 289 | Q3 | Sequence Word Bit 3 |
| 27 | 290 | B0 | B0 = Q1 × Q2 × Q3 |
| 28 | 291 | B1 | B1 = Q0 × Q1 × Q3 |
| 29 | 292 | B2 | B2 = Q0 × Q2 × Q3 |

In each field 152, 154 of a video frame, up to 13 16-bit content words 158 may follow the ISDW 156, as shown below in Table 2.

TABLE 2

| Word Value Range | | |
|---|---|---|
| Field 1 | Field 2 | Defined Class |
| 30 | 293 | Start of Content Word 0 |
| 46 | 309 | Start of Content Word 1 |
| 62 | 325 | Start of Content Word 2 |
| 78 | 341 | Start of Content Word 3 |
| 94 | 357 | Start of Content Word 4 |
| 110 | 373 | Start of Content Word 5 |
| 126 | 389 | Start of Content Word 6 |
| 142 | 405 | Start of Content Word 7 |
| 158 | 421 | Start of Content Word 8 |
| 174 | 437 | Start of Content Word 9 |
| 190 | 453 | Start of Content Word 10 |
| 206 | 469 | Start of Content Word 11 |
| 222 | 485 | Start of Content Word 12 |
| 237 | 500 | End of Content Word 12 |
| 238–263 | 517–525 | Unused video lines |

Each content word preferably includes a plurality of data bits 164 and a plurality of error correction bits 166 defining a correction sequence that allows a single-bit error in the data bits to be detected and corrected. For example, the content word may include a seven-bit Hamming code (i.e., four data bits and three error correction bits) and a nine-bit Hamming code (i.e., five data bits and four error correction bits) in the format shown below in Table 3.

TABLE 3

| Offset from first line | Symbol | Description |
|---|---|---|
| +0 | M0 | Data Bit 0 |
| +1 | M1 | Data Bit 1 |
| +2 | M2 | Data Bit 2 |
| +3 | M3 | Data Bit 3 |
| +4 | B0 | B0 = M1 × M2 × M3 |

TABLE 3-continued

| Offset from first line | Symbol | Description |
|---|---|---|
| +5 | B1 | B1 = M1 × M1 × M3 |
| +6 | B2 | B2 = M1 × M2 × M3 |
| +7 | M4 | Data Bit 4 |
| +8 | M5 | Data Bit 5 |
| +9 | M6 | Data Bit 6 |
| +10 | M7 | Data Bit 7 |
| +11 | M8 | Data Bit 8 |
| +12 | B3 | B3 = M4 × M5 × M6 × M7 |
| +13 | B4 | B4 = M4 × M5 × M7 × M8 |
| +14 | B5 | B5 = M4 × M6 × M7 × M8 |
| +15 | B6 | B6 = M5 × M6 × M7 × M8 |

Although many other, often more sophisticated, data correction techniques may be used, Hamming codes are preferred because of their simplicity and small computation requirement.

FIGS. 5*a* and 5*b* illustrate the determination of a selected sampling point in a prescan portion of a horizontal overscan data stream. FIG. 5*a* shows a diagram illustrating the division of a prescan portion of a single field in a standard 525-line two-field interlaced NTSC video signal. The adaptive timing processor 104 determines a predefined timing window 202 over the pre-visible horizontal overscan area 127 of the horizontal overscan data steam 204 of a single field 206. The adaptive timing processor 104 uses the same predefined timing window 202 over a range of a predefined number of fields 206. For example, as shown in FIG. 5*b*, the adaptive timing processor 104 can define a timing window 202 in the prescan portion 127 of the encoded video signal 102 comprising 8.8 microseconds to 11.0 microseconds after the H-REF over a range of six or more fields 206*a*–*m* of the video signal 204.

Using a predefined increment "n", the adaptive timing processor 104 divides the timing window 202 into "n" number of relatively equally sized sub-portions 208*a*–*n* using "n+1" sampling points 210. The adaptive processor 104 sweeps each sub-portion 208*a*–*n* for the presence of an ISDW 212 within the timing window 202. For example, the adaptive timing processor 104 sets a series of six sampling points 210 which divide a timing window 202 into five relatively equally sized sub-portions 208*a*–*n* within a single field 206. The adaptive timing processor 104 sweeps each of the five sub-portions 208*a*–*n* between adjacent sampling points 210 of the field 206 for the presence of an ISDW 212.

The presence of an ISDW 212 in the field 206 of the video signal 102 is distinguished by a pattern identification word consisting of four bits. The value of the pattern identification word in each contiguous field cyclically sequences through a defined set of values. The presence of the pattern identification word distinguishes an encoded video signal from a normal video signal. In a normal video signal, random noise appears in place of the pattern identification word. An adaptive timing processor 104 attempting to recover control data from an encoded video signal 102 therefore determines whether the signal is an encoded video signal by detecting the presence of the pattern identification. Thus, the pattern identification word provides an additional layer of integrity to the recovered control data beyond that of simple checksum error detection.

FIG. 5*b* shows a diagram illustrating the division of several fields of a horizontal overscan data stream into sub-portions. Using a predefined increment "m", the adaptive timing processor 104 scans "m" number of fields 206a–m for the presence of an ISDW 212. When the adaptive timing processor 104 detects the presence of an ISDW 212 within a particular sub-portion 208a–n of the timing window 202, the adaptive timing processor 104 sets a flag 214a–m for the particular sub-portion location. After the adaptive timing processor 104 has scanned a particular sub-portion location in each of a particular number of fields 206a–m, the timing phase is adjusted so that a different sub-portion location is scanned by the adaptive timing processor 104. After all of the sub-portions 208a–n have been scanned for "m" number of fields 206a–m, the adaptive timing processor 104 determines the correct timing phase for scanning subsequent fields 206a–m and their respective sub-portions 208a–n for the presence of an ISDW 212.

For example, the adaptive timing processor 104 can scan a particular sub-portion in each of eight fields 206a–m. The adaptive timing processor 104 selects the third sub-portion 208c, between sampling points "$T_{min}+T_{2n}$" and "$T_{min}+T_{3n}$" as illustrated in FIG. 5a, of each field 206a–m to scan. If a valid ISDW 212 is detected in the third sub-portion 208c of any of the scanned fields 206a–m, a flag 214a is set for the particular sub-portion 208c and field 206a–m indicating the presence of an ISDW 212 in the particular sub-portion 208c for the particular field 206a–m. After all of the particular sub-portions 208c have been scanned in the particular fields 206a–m, the adaptive timing processor 104 repeats the scan for another particular sub-portion 208 in all of the particular fields 206a–m until all of the sub-portions 208 for all of the fields 206a–m have been scanned for an ISDW 212. Typically, each timing phase will be measured for six fields 206a–m to allow time to scan for an ISDW 212. However, the number of sub-portions 208 and fields 206a–m scanned by the adaptive timing processor 104 can be varied with an increased number of sub-portions or fields, or both, increasing the scan time.

FIG. 5c shows a flag table for determining a selected sampling point within a set of scanned fields. When an ISDW 212a–m is detected in a particular scanned sub-portion 208a–n of a particular field 206a–m, the adaptive timing processor 104 sets a flag 214a–m indicating the particular sub-portion 208a–n the ISDW 212a–m was detected in. The adaptive timing processor 104 uses the table of checked flags 214a–m or the stored sub-portion locations of the detected ISDW 212a–m to determine a selected sampling point 216. For example, an adaptive timing processor 104 determines the center point or average location of the sub-portion positions where an ISDW 212 has been detected over a range of eight fields 206. The adaptive timing processor 104 uses the center point or average location of the sub-portion positions to set a selected sampling point 216. The selected sampling point 216 designates a "lock-on" position for the adaptive timing processor 104 to use for locating encoded data in subsequent scans.

FIG. 5d shows a diagram illustrating a subsequent video signal 218 with a selected sampling point 216 for the adaptive timing processor 104 to "lock on". The adaptive timing processor 104 determines the selected sampling point 216, and uses the selected sampling point 216 to find the ISDW 212 in subsequent data fields 220a–m. The selected sampling point 216 represents an optimum location within subsequent data fields 220a–m to find the ISDW 212.

Figure 6:
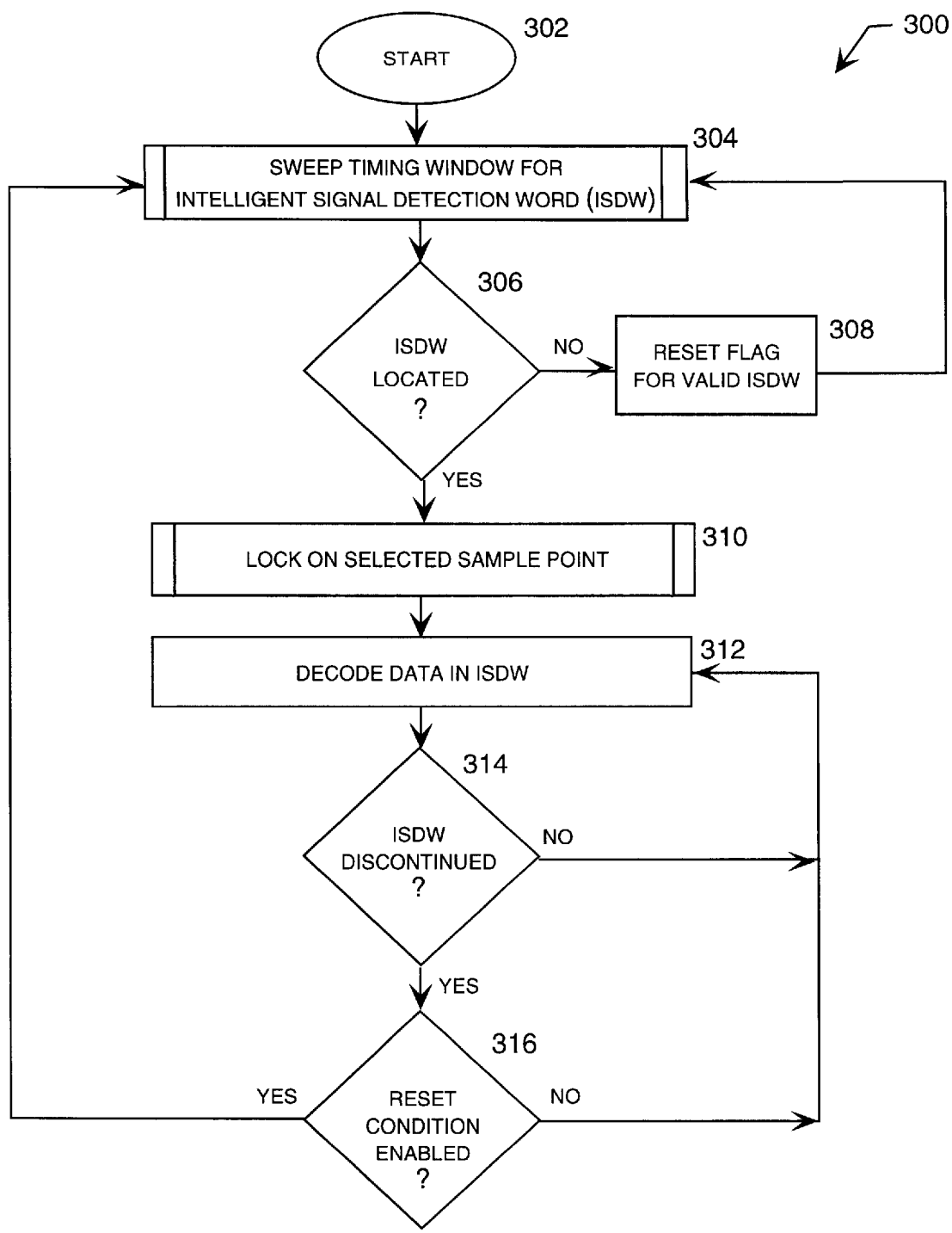
FIG. 6 is a logic flow diagram illustrating a method for recovering data from a television signal encoded with horizontal overscan data.

FIG. 6 is a logic flow diagram illustrating a method for recovering data from a television signal encoded with horizontal overscan data. The steps illustrated by FIG. 6 are performed by an adaptive timing module 100 operating with an adaptive timing processor 104. Step 302 starts routine 300 performed by the adaptive timing processor.

Step 302 is followed by routine 304, in which the adaptive timing processor 104 sweeps a timing window 202 in a received video signal 204 for the presence of an intelligent signal detection word (ISDW) 212. Other similar types of signals or markers can be located by the adaptive timing processor 104 when programmed into the routine 304 executed by the adaptive timing processor 104. Routine 304 is further described in FIG. 7.

The adaptive timing processor 104 returns to decision block 306, in which the adaptive timing processor 104 determines whether an ISDW 212 has been located within the timing window 202 of the video signal 102. The adaptive timing processor 104 looks at the data received from the each sub-portion 208 of each field 206 of the video signal 104 for a pattern identification word consisting of four bits. The presence of the pattern identification word distinguishes an encoded video signal from a normal video signal. If an ISDW 212 is not detected, then the "NO" branch is followed to step 308, in which the adaptive timing processor 104 resets a flag 214 indicating a valid ISDW. Step 308 returns to routine 304 to continue sweeping the timing window 202 for an ISDW 212.

If an ISDW 212 is detected, then the "YES" branch is followed to routine 310, in which the adaptive timing processor 104 locks onto a selected sampling point 216. The selected sampling point 216 is used by the adaptive timing processor 104 to optimize locating ISDW's 212 in a subsequent encoded video signal. Routine 310 is further described in FIG. 8.

Routine 310 returns to step 312, in which the adaptive timing processor 104 decodes the data in the ISDW 212. As described previously in FIG. 4b, the ISDW 212 contains a plurality of data bits and a plurality of error correction bits defining a correction sequence that allows a single-bit error in the data bits to be detected and corrected. Furthermore, a consecutive series of ISDW's 212 defines a dynamic validation sequence indicating the presence of video data following each ISDW 212.

Step 312 is followed by decision block 314, in which the adaptive timing processor 104 determines whether the ISDW 212 is no longer detected by the adaptive timing processor 104. For example, in some cases, an ISDW 212 in a television broadcast signal may be briefly interrupted by an event that does not contain encoded data such as a single commercial break, after which the television broadcast signal will continue to be broadcast. The adaptive timing processor 104 waits for a predetermined amount of time such as an acquisition delay to determine if the ISDW 212 is discontinued. In such cases, the adaptive timing processor 104 retains the last "lock-on" position to use for locating encoded data in subsequent scans of the signal. If an ISDW 212 is continues to be detected in decision block 314, then the "NO" branch is followed to return to step 312, in which the adaptive timing processor 104 continues to decode data in the ISDW 212.

If an ISDW 212 is no longer detected in decision block 314, then the "YES" branch is followed to decision block 316, in which the adaptive timing processor 104 determines whether a reset condition is enabled. For example, in other cases, an ISDW in a television broadcast signal will no longer be detected when the signal is interrupted by an event that does not contain encoded data such as a commercial break. After a series of commercial breaks, the correct data recovery timing may be lost. In such a case, the adaptive timing processor waits for a predetermined amount of time such as an acquisition delay before determining that the ISDW is not longer detected.

Decision block 316 checks for the presence of a reset condition. A reset condition is caused by a triggering event such as the elapse of a predetermined amount of time, or manually activating a reset switch. When a reset condition is detected by the adaptive timing processor 104, then the "YES" branch is followed to routine 304, in which the sweep or scan routine begins again to reacquire an ISDW. If a reset condition is not detected by the adaptive timing processor 104, the "NO" branch is followed to step 312, in which the last "lock on" position determined by the adaptive timing processor 104 is used for locating encoded data in subsequent scans of the signal 204.

Figure 7:
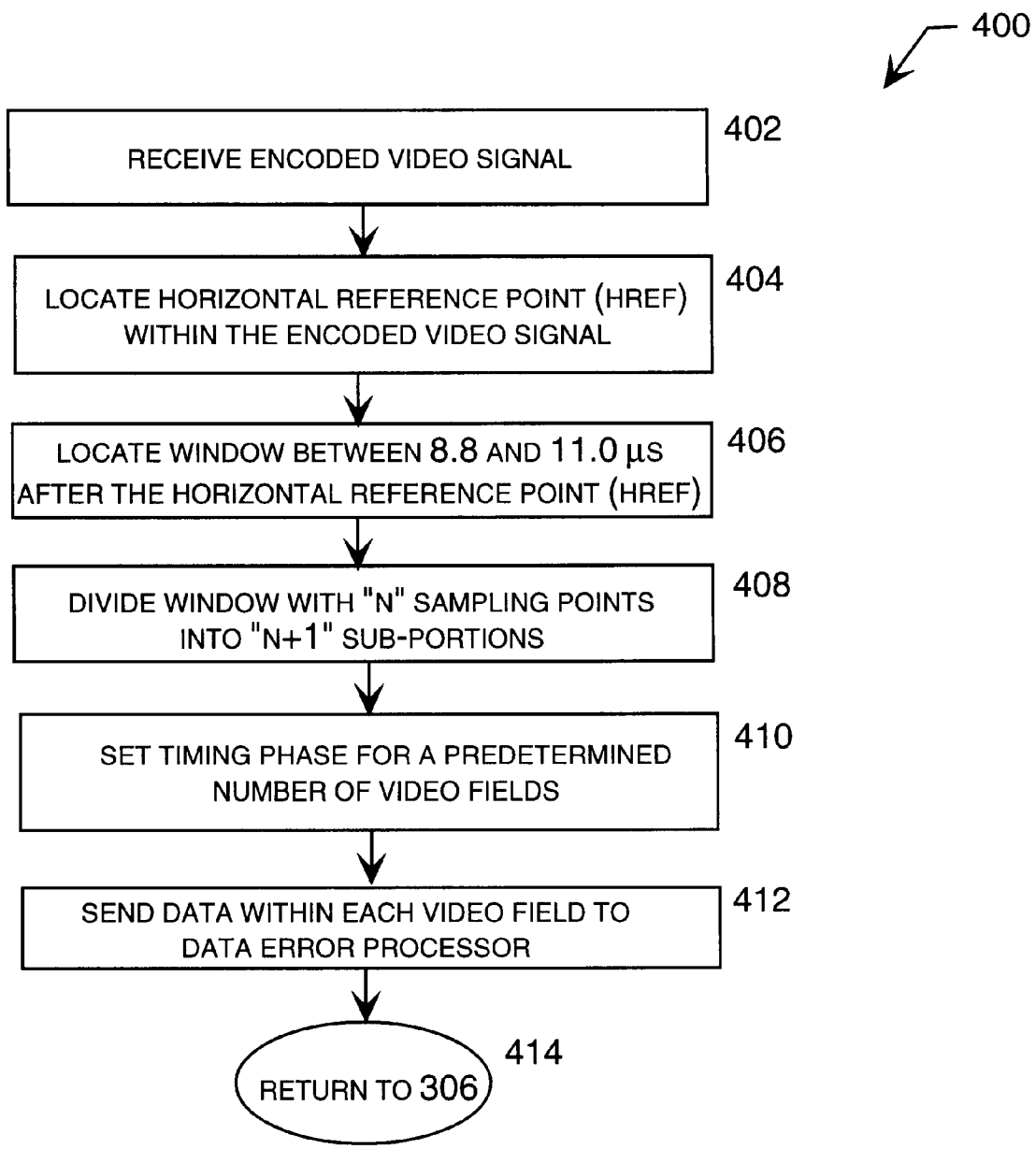
FIG. 7 is a logic flow diagram illustrating a method for sweeping a timing window for an intelligent signal detection word (ISDW).

FIG. 7 is a logic flow diagram illustrating a method for sweeping a timing window for an intelligent signal detection word (ISDW). The steps illustrated by FIG. 7 are performed by an adaptive timing module 100 operating with an adaptive timing processor 104. Routine 400 begins following step 304 in FIG. 6. In step 402, the adaptive timing processor 104 receives an encoded video signal 102 from an audio/video signal source 56.

Step 402 is followed by step 404, in which the adaptive timing processor 104 locates a horizontal reference point (H-REF) within the encoded video signal 102. As shown in FIGS. 3a–b, the H-REF typically precedes a prescan portion 127 of the encoded video signal 102.

Step 404 is followed by step 406, in which the adaptive timing processor 104 locates a timing window 202 between a predetermined range of approximately 8.8 to 11.0 microseconds after the H-REF. The predetermined range can be set for other values as long as the range covers the expected position of the horizontal overscan data area 127. For example, as shown in FIGS. 5a–c, the expected position of the horizontal overscan data area 127 is between 9.2 and 10.2 microseconds.

Step 406 is followed by step 408, in which the adaptive timing processor 104 divides each video field 206 into "n" number of equally-sized sub-portions 208 by selecting sampling points 210 along the width of each video field 206a–m. For example, as shown in FIGS. 5a–c, each video field 206 a–m is divided by a set of sampling points 210 into five sub-portions 208.

Step 408 is followed by step 410, in which the adaptive timing processor 104 sets a timing phase defining a predetermined number of video fields 206a–m to be scanned by the routine 400. For example, as shown in FIGS. 5a–c, the number of video fields 206a–m scanned is eight fields.

Step 410 is followed by step 412, in which the data within each video field 206 is sent to an adaptive timing processor 104 to determine the presence of an ISDW 212 within sub-portion 208. The adaptive timing processor 104 receives the data within each sub-portion 208, and processes the data to determine the presence of the pattern identification word distinguishing an encoded video signal from a normal video signal. Step 412 is followed by step 414, in which the routine 400 returns to decision block 306 in FIG. 6, in which the adaptive timing processor 104 determines whether a valid ISDW 212 has been located within the scanned sub-portion 208.

Figure 8:
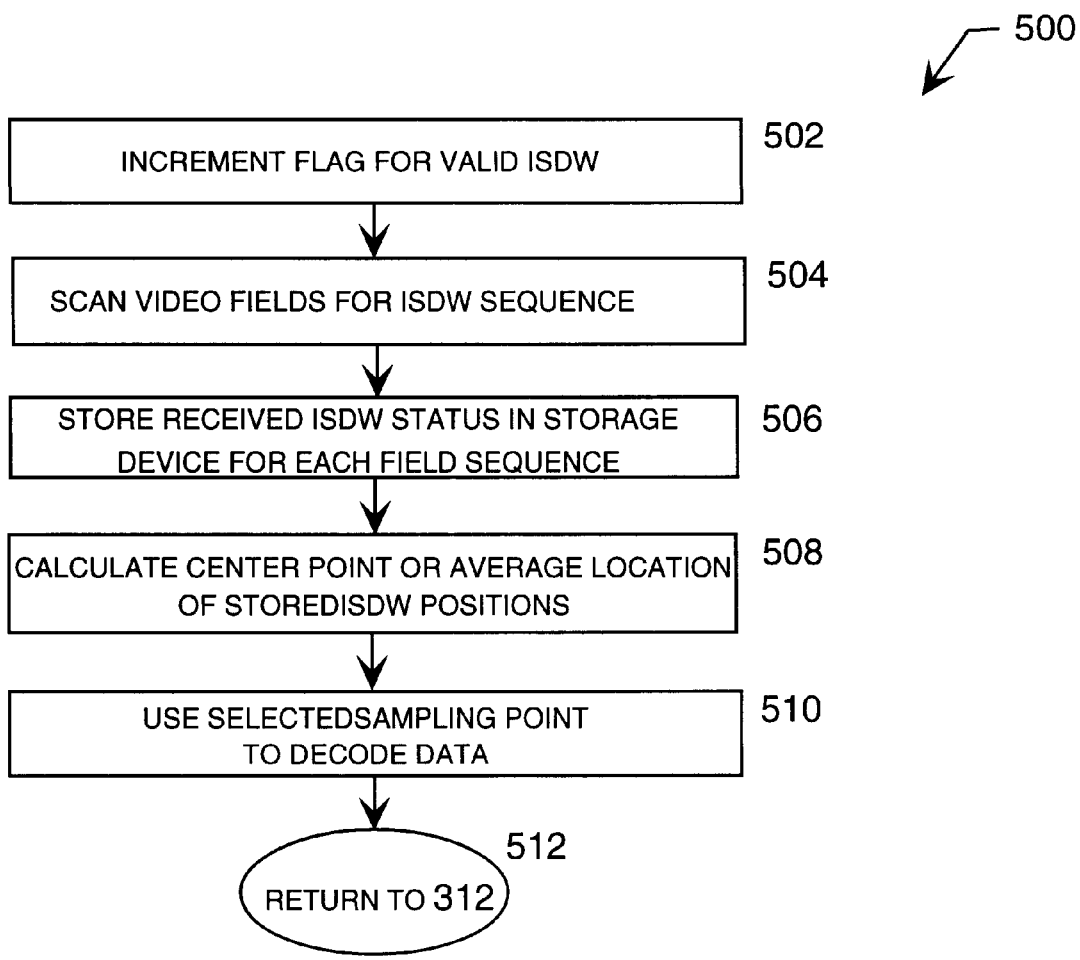
FIG. 8 is a logic flow diagram illustrating a method for locking onto a selected sample point.

FIG. 8 is a logic flow diagram illustrating a method for locking onto a selected sampling point. The steps illustrated by FIG. 8 are performed by an adaptive timing module 100 operating with an adaptive timing processor 104. Routine 500 begins following the "YES" branch of decision block 302 in FIG. 6. In step 502, the adaptive timing processor 104 increments a flag 214 indicating the presence of a valid ISDW within a sub-portion 208 of a field 206a–m.

Step 502 is followed by step 504, in which the adaptive timing processor 104 scans all of the "n" number of the video fields 206a–m for an ISDW 212. Each of the video fields 206a–m is divided into sub-portions 208, in which the adaptive timing processor 104 sweeps each sub-portion 208 of each field 206 a–m for a valid ISDW 212 signal.

Step 504 is followed by step 506, in which the adaptive timing processor 104 stores the location of the valid ISDW in a storage device such as RAM or a data buffer 92. For example, as described in FIG. 5c, a table containing video signal fields and the locations of detected ISDW's can be generated by the adaptive timing processor 104.

Step 506 is followed by step 508, in which the adaptive timing processor 104 uses the stored positions of the valid ISDW's within the fields 206a–m, and calculates a selected sampling point 216 for decoding subsequent data within the encoded video signal 102. For example, as shown in FIG. 5c, the adaptive timing processor 104 uses stored ISDW locations in the storage device 92 to calculate a selected sampling point 216 such as a center point of the sub-portion locations where a valid ISDW 212 was found within each field 206 a–m. Furthermore, using the center point of the detected valid ISDW's permits the adaptive timing processor 104 to estimate the magnitude of the horizontal phase or shift error.

Step 508 is followed by step 510, in which the adaptive timing processor 104 uses the selected sampling point 216 to "lock on" to a position in subsequent fields 220a–b for scanning data 218 in the encoded video signal 102. For example, as shown in FIGS. 5c–d, using the center point of the detected valid ISDW positions creates an estimated location or selected sampling point 216 for optimizing detection of subsequent ISDW's 222 within the same encoded video signal 102.

Step 510 is followed by step 512, in which the routine returns to step 312 in FIG. 6, where data is decoded by the adaptive timing processor 104.

Figure 9:
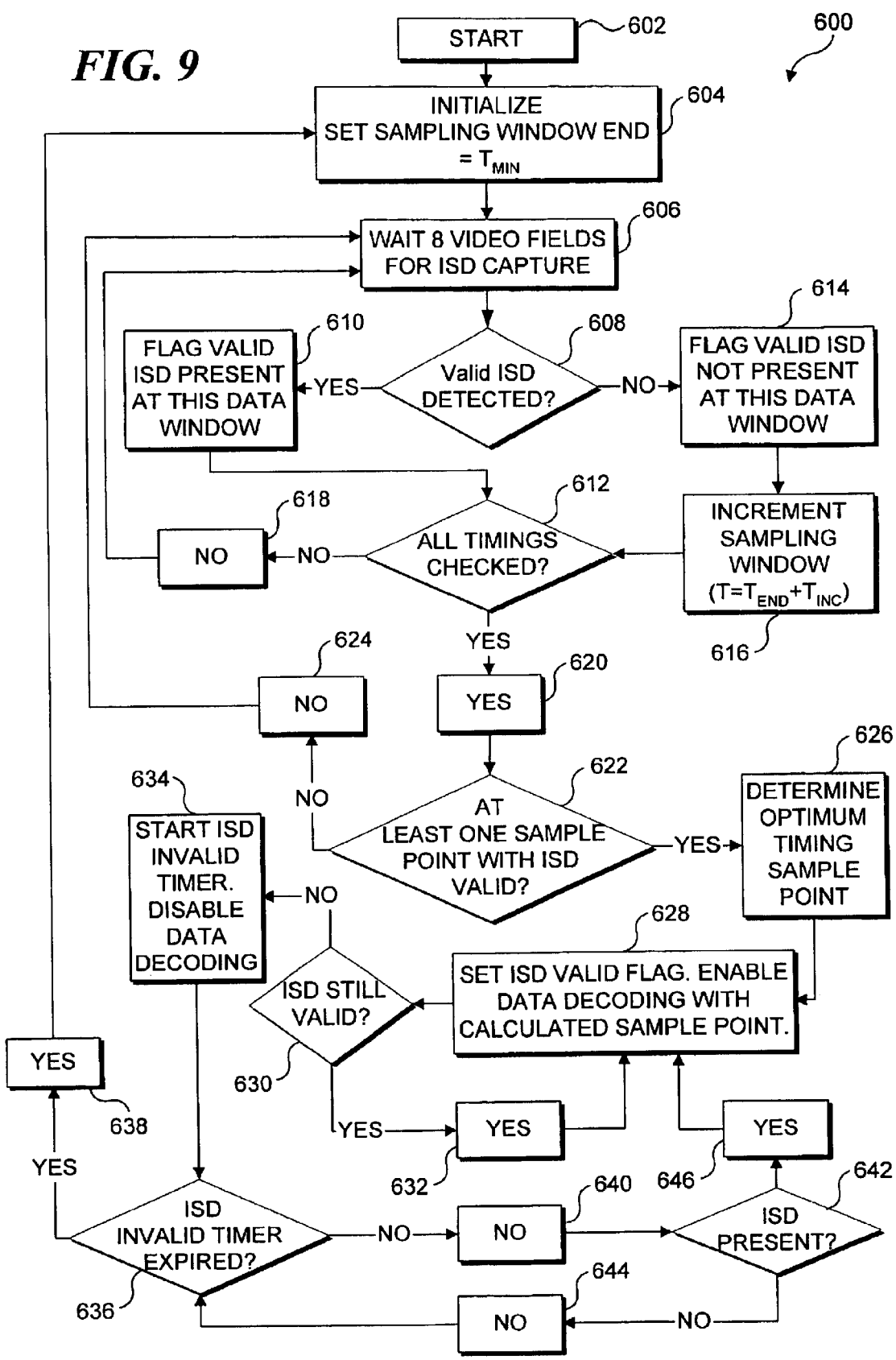
FIG. 9 is a logic flow diagram illustrating an example of a method for recovering data from a television signal encoded with horizontal overscan data in accordance with the present invention.

FIG. 9 is a logic flow diagram illustrating an exemplary method for recovering data from a television signal encoded with horizontal overscan data in accordance with the present invention. The steps illustrated by FIG. 9 are performed by an adaptive timing module 100 operating with an adaptive timing processor 104. Routine 600 begins with the start block 602.

Step 602 is followed by step 604, in which the adaptive timing processor 104 sets a series of sampling windows or sub-portions 208 within a timing window 202 of an encoded video signal 102. That is, adaptive timing processor 104 divides a timing window 202 where a pre-visible overscan area 127 is expected to be into a number of sub-portions 208, for example, a timing window 202 can be defined between $T_{min}$ to $T_{max}$, wherein $T_{min}$ is approximately 8.8 microseconds after H-REF and $T_{max}$ is approximately 11.0 microseconds after H-REF, when the expected pre-visible horizontal overscan are 127 is expected to be located between 9.2 and 10.2 microseconds after H-REF. As shown in FIG. 5a, the timing window 202 is divided into a series of five sampling windows or sub-portions 208. As the notation of the block representing step 604 indicates, a sampling window within the timing window is defined. The sampling window represents that portion of the timing window that will be sampled first. As is described in greater detail below, the entire timing window is searched by incrementally selecting different sampling windows within the timing window. Preferably, in step 604, the sampling window is set to $T_{min}$.

Step 604 is followed by step 606, in which the adaptive timing processor 104 waits for eight video fields 206a–m to capture or detect an ISDW 212. The number of video fields 206a–m is a preselected number based upon the available processor time and capacity. A lesser or greater number of video fields 206a–m can be selected and scanned to capture or detect an ISDW 212. As shown in FIG. 5b, eight fields 206a–m are scanned by the adaptive timing processor 104 for the presence of an ISDW 212.

Step 606 is followed by decision block 608, in which the adaptive timing processor 104 determines whether a valid ISDW 212 is detected. If a valid ISDW 10 212 is detected, then the "YES" branch is followed to step 610. In step 610, the adaptive timing processor 104 sets a flag 214 indicating a valid ISDW 212 in the sampling window or sub-portion 208. As shown in FIGS. 5b–c, a flag 214a–m can be set indicating a valid ISDW 212 in a particular sampling window or sub-portion 208 for each field 206 a–m.

Step 610 is followed by decision block 612, in which the adaptive timing processor 104 determines whether all of the sampling windows or sub-portions 208 have been checked or scanned by the adaptive timing processor 104 for a valid ISDW 212.

If a valid ISDW 212 is not detected by decision block 608, then the "NO" branch is followed to Step 614. In step 614, the adaptive timing processor 104 sets a flag 214 indicating that a valid ISDW 212 is not present in the timing window 202.

Step 614 is followed by step 616, in which the adaptive timing processor 104 increments the sampling window or sub-portion 208 by $T_{inc}$. As shown in FIG. 5a, a field 206 is divided into increments, each with the width of $T_n$.

Step 616 is followed by decision block 612, in which the adaptive timing processor 104 determines whether all of the sampling windows or sub-portions 208 have been checked or scanned by the adaptive timing processor 104 for a valid ISDW 212. If not all of the sampling windows or sub-portions 208 have been checked, then the "NO" branch is followed to step 618, returning to step 606, in which the adaptive timing processor 104 scans eight video fields 206a–m to capture or detect an ISDW 212.

If all of the sampling windows or sub-portions 208 have been checked, then the "YES" branch is followed to step 620, and then to decision block 622. Decision block 622 determines whether at least one sampling point or sub-portion 208 contains a valid ISDW 212. If none of the sampling points or sub-portions 208 contain a valid ISDW 212, then the "NO" branch is followed to step 624, returning to step 606, in which the adaptive timing processor 104 scans for six video fields 206a–m to capture or detect an ISDW.

If at least one of the sampling point or sub-portion 208 contains a valid ISDW 212, then the "YES" branch is followed to step 626, in which the adaptive timing processor 104 determines an optimum timing sample point or a selected sampling point 216. An optimum timing sample point or a selected sampling point 216 can be an average location or a center point between two or more ISDW sampling point or sub-portion positions. Other similar types of optimum timing sample points or selected sampling points can be calculated by the adaptive timing processor 104 for use with the routine 600.

Step 626 is followed by step 628, in which the adaptive timing processor 104 sets a flag 214 indicating a valid ISDW 212 at the sampling point or sub-portion 208 location. Furthermore, step 628 enables data decoding of the encoded video signal 102 using the calculated optimum timing sample point or selected sampling point 216. The adaptive timing processor 104 uses the optimum timing sample point or selected sampling point 216 to decode subsequent data 220 within the encoded video signal 102.

Step 628 is followed by decision block 630, in which the adaptive timing processor 104 determines whether the ISDW 212 is still valid. If the ISDW 212 is still valid, then the "YES" branch is followed to step 632, returning to step 628 where the adaptive timing processor 104 continues data decoding of the encoded video signal 102 using the calculated optimum timing sample point or selected sampling point 216.

If the ISDW 212 is not valid, then the "NO" branch is followed to step 634, in which the adaptive timing processor 104 starts an invalid ISDW timer. Furthermore, step 634 disables data decoding of the encoded video signal. Step 634 is followed by decision block 636, in which the adaptive timing processor 104 determines whether the invalid ISDW timer has expired.

If the invalid ISDW timer has expired, then the "YES" branch is followed to step 638, in which the routine 600 begins again.

If the invalid ISDW timer has not expired, then the "NO" branch is followed to step 640, which is followed by decision block step 642. Step 642 determines whether an ISDW 212 is present in the sampling window or sub-portion 208.

If no ISDW 212 is detected by the adaptive timing processor 104, then the "NO" branch is followed to step 644, returning to decision block 636 to determine whether the ISDW invalid timer has expired. However, if an ISDW 212 is detected, then the "YES" branch is followed to step 646, returning to step 628 continuing the data decoding with the calculated sample point or selected sampling point 216.

In view of the foregoing, it will be appreciated that the invention provides an adaptive timing module for recovering data from a video signal encoded with horizontal overscan data. Furthermore, the present invention provides a system and method for counteracting horizontal picture or phase shift in a video signal. The present invention also provides a system and method for correcting horizontal picture or phase shift without using complex or expensive devices. It should be understood that the foregoing relates only to the exemplary embodiments of the present invention, and that numerous changes may be made therein without departing from the spirit and scope of the invention as defined by the following claims.

The invention claimed is:

1. A computer-readable medium having computer-executable instructions for carrying out a plurality of functions, including:
   providing an adaptive timing processor for extracting digital data encoded in a horizontal overscan portion of a video signal, said adaptive timing processor performing the steps of:
   conducting a sweeping operation through a timing search range within a plurality of scan lines over multiple fields of the video signal to detect a horizontal position within the scan lines associated with the digital data, the timing search range defining a plurality of sampling points within the horizontal overscan portion of the scan lines of the video signal, the sampling points corresponding to at least a first horizontal position at which the digital data are expected to be found based on a particular encoding scheme, and at least one additional horizontal position at which the digital data could be found due to a horizontal phase shift;

based on the sweeping operation, determining a desired horizontal detection position within the scan lines; and detecting digital data encoded at the desired horizontal detection position of subsequent fields of the video signal.

2. The computer-readable medium of claim 1, wherein the timing search range comprises a range between about 8.8 and about 11.0 microseconds from a horizontal synchronization pulse or a timing signal that indicates the beginning of a scan line.

3. The computer-readable medium of claim 1, wherein the digital data encoded in the horizontal overscan portion of the video signal comprises a specific data sequence that indicates the beginning of a field of digital data.

4. The computer-readable medium of claim 1, wherein the digital data encoded in the horizontal overscan portion of the video signal comprise an intelligent signal detect word (ISDW).

5. The computer-readable medium of claim 3, wherein the step of determining a desired horizontal detection position within the scan lines comprises the step of comparing the desired horizontal position to a measured horizontal position.

6. The computer-readable medium of claim 4, wherein the step of determining a desired horizontal detection position within the scan lines comprises the step of comparing the digital data encoded in the horizontal overscan portion of the video signal to the ISDW.

7. The computer-readable medium of claim 1, wherein the step of conducting a sweeping operation through a timing search range within a plurality of scan lines over multiple fields of the video signal comprises the steps of:

dividing the timing search range into a plurality of equal portions, such that each portion includes at least one sampling point;

scanning each portion of the timing search range for digital data within the scan lines associated with the portion;

storing an indication of whether valid digital data was detected within each portion; and determining a center point of the portions where valid data are detected.

8. The computer-readable medium of claim 7, wherein the step of determining a desired horizontal detection position within the scan lines comprises the step of locking onto the center point of the portions where valid data are detected.

9. The computer-readable medium of claim 1, wherein said adaptive timing processor repeats the step of detecting digital data encoded at the desired horizontal detection position of subsequent fields of the video signal until a reset condition is enabled.

10. The computer-readable medium of claim 9, wherein said adaptive timing processor further performs the step of responding to a reset condition, by repeating the steps of claim 1.

11. The computer-readable medium of claim 9, wherein the reset condition comprises the lapse of a predefined length of time.

12. The computer-readable medium of claim 9, wherein the reset condition comprises manually triggering a reset button.

13. In a display device for recovering data from a video signal divided into frames, wherein each frame comprises a plurality of horizontal scan lines consecutively illuminated on the display device, each scan line having a prescan portion including a pre-data encoding zone, a method for detecting encoded data in the pre-data encoding zone over a plurality of subsequent frames, comprising the steps of:

determining a set of sampling points within the prescan portion, the set of sampling points corresponding to at least a first sampling point at which the data are expected to be found based on a particular encoding scheme, and at least one additional sampling point at which the data could be found due to a horizontal phase shift;

sweeping over the set of sampling points within the prescan portion to identify encoded data; and detecting the encoded data within the prescan portion.

14. In the display device of claim 13, said method further comprising the steps of:

determining a center point of the sampling points at which encoded data are identified;

locking onto the center point of the sampling points at which encoded data are identified; and using the center point of the sampling points at which encoded data are identified for recovering the encoded data from the video signal.

15. In the display device of claim 13, the method wherein the encoded data comprises a predefined intelligent signal detect word (ISDW).

16. In the display device of claim 13, the method wherein the prescan portion comprises a range between about 8.8 and about 11.0 microseconds from a horizontal synchronization pulse or a timing signal that indicates the beginning of a scan line.

17. In the display device of claim 14, the method's step of determining a center point of the sampling points comprising the steps of:

dividing the prescan portion into a plurality of equally sized sub-portions;

scanning each sub-portion to detect the presence of encoded data; and storing a sampling position associated with the encoded data detected in each sub-portion.

18. In the display device of claim 13, said method further comprising the step of triggering a reset condition.

19. In the display device of claim 13, said method further comprising the step of repeating the step of detecting the encoded data within the prescan portion, until a reset condition is enabled.

20. In the display device of claim 19, said method further comprising the steps of repeating the steps of claim 19 in response to a reset condition.

21. In the display device of claim 18, the method wherein the reset condition comprises the lapse of a predefined length of time.

22. The display device of claim 18, wherein the reset condition comprises manually triggering a reset button.

23. A method for adjusting a decoder for horizontal phase shift while recovering digital data encoded in a horizontal overscan portion of a video signal, comprising the steps of:

conducting a sweeping operation through a timing search range within a plurality of scan lines over multiple fields of the video signal to detect encoded data within scan lines, the timing search range defining a plurality of sampling points within the horizontal overscan portion of the scan lines of the video signal, the sampling points corresponding to at least a first horizontal position at which the digital data are expected to be found based on a particular encoding scheme, and at least one additional horizontal position at which the digital data could be found due to horizontal phase shift;

based on results obtained from the sweeping operation, determining a desired horizontal detection position within the scan lines; and detecting digital data encoded at the desired horizontal detection position of subsequent fields of the video signal.

24. The method of claim 23, wherein the timing search range comprises a range between about 8.8 and about 11.0 microseconds from a horizontal synchronization pulse or a timing signal that indicates a beginning of a scan line.

25. The method of claim 23, wherein the encoded data comprise a specific data sequence indicating a beginning of a field of digital data.

26. The method of claim 23, wherein the encoded data comprise an intelligent signal detect word (ISDW).

27. The method of claim 23, wherein the step of determining a desired horizontal detection position within the scan lines comprises the step of comparing a desired data sequence to a data sequence within the scan lines.

28. The method of claim 27, wherein the desired data sequence comprises an intelligent signal detect word (ISDW).

29. The method of claim 23, wherein the step of conducting a sweeping operation through a timing search range within a plurality of scan lines over multiple fields of the video signal further comprises the steps of:

dividing the timing search range into a plurality of equal portions such that each portion includes at least one sampling point;

scanning each portion of the timing search range for a horizontal position within the scan lines associated with the digital data;

storing an indication as to whether valid data were detected within each portion; and determining a center point of the portions where valid data are detected.

30. The method of claim 29, wherein the step of determining a desired horizontal detection position within the scan lines comprises the step of locking onto the center point of the portions where the valid data are detected.

31. The method of claim 23, further comprising the step of repeating the step of detecting digital data encoded at the desired horizontal detection position of subsequent fields of the video signal, until a reset condition is enabled.

32. The method of claim 23, further comprising the step of repeating the steps of claim 23 in response to a reset signal.

33. The method of claim 31, wherein the reset condition comprises the lapse of a predetermined length of time.

34. The method of claim 31, wherein the reset condition comprises manually triggering a reset button.

* * * * *